(12) United States Patent
Bostick et al.

(10) Patent No.: US 8,990,610 B2
(45) Date of Patent: Mar. 24, 2015

(54) PREFERRED RESOURCE SELECTOR

(75) Inventors: James E. Bostick, Austin, TX (US);
John M. Ganci, Jr., Durham, NC (US);
John P. Kaemmerer, Austin, TX (US);
Craig M. Trim, Glendale, CA (US)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 12/723,121

(22) Filed: Mar. 12, 2010

(65) Prior Publication Data
US 2011/0225447 A1    Sep. 15, 2011

(51) Int. Cl.
*G06F 11/00* (2006.01)
*H04L 29/06* (2006.01)
*G06F 21/85* (2013.01)
*H04L 29/08* (2006.01)
*H04L 29/12* (2006.01)

(52) U.S. Cl.
CPC ............ *H04L 63/0272* (2013.01); *G06F 21/85* (2013.01); *H04L 29/08* (2013.01); *H04L 63/0209* (2013.01); *H04L 67/02* (2013.01); *G06F 2221/2119* (2013.01); *G06F 2221/2129* (2013.01); *H04L 29/12226* (2013.01); *H04L 29/12594* (2013.01); *H04L 61/2015* (2013.01); *H04L 61/30* (2013.01)
USPC .............................. 714/4.1; 709/223; 726/13

(58) Field of Classification Search
USPC .................... 709/223; 714/4.1; 726/13, 14, 15
See application file for complete search history.

(56) References Cited

U.S. PATENT DOCUMENTS

| 5,793,964 | A |   | 8/1998  | Rogers et al.               |
|-----------|---|---|---------|-----------------------------|
| 6,092,100 | A | * | 7/2000  | Berstis et al. ...... 709/203 |
| 6,604,135 | B1|   | 8/2003  | Rogers et al.               |
| 6,941,369 | B1| * | 9/2005  | Krack et al. ......... 709/225 |
| 6,963,982 | B1| * | 11/2005 | Brustoloni et al. ..... 726/15 |
| 7,035,896 | B1|   | 4/2006  | Schneider                   |
| 7,103,642 | B1|   | 9/2006  | Chen et al.                 |
| 7,207,005 | B2| * | 4/2007  | Lakritz .............. 715/201 |
| 7,266,715 | B1| * | 9/2007  | Bazzinotti et al. ..... 714/4.4 |
| 7,376,752 | B1| * | 5/2008  | Chudnovsky et al. ..... 709/245 |
| 7,461,170 | B1| * | 12/2008 | Taylor et al. ......... 709/245 |
| 7,463,627 | B1| * | 12/2008 | Chase et al. ......... 370/389 |
| 7,650,392 | B1| * | 1/2010  | Goodwin ............. 709/219 |
| 7,797,442 | B2| * | 9/2010  | Robinson ............ 709/231 |
| 7,873,707 | B1| * | 1/2011  | Subramanian et al. .... 709/219 |

(Continued)

FOREIGN PATENT DOCUMENTS

JP    199990106691    4/1999

OTHER PUBLICATIONS

IBM; Multi Home-page for Multi-tabbed Internet Browsers; Article; May 11, 2005; pp. 4; IP.com.

(Continued)

*Primary Examiner* — Joshua P Lottich
(74) *Attorney, Agent, or Firm* — Robert C. Rolnik

(57) ABSTRACT

A computer implemented method, and computer program product for requesting resources. The computer receives an assignment of an Internet protocol address. The computer compares a computer context of a client computer with an intranet access criterion to form a comparison result. The computer selects at least one preferred uniform resource identifier based on the comparison result, indicating the intranet is accessible. The computer transmits a request to a server using at least one preferred uniform resource identifier using a packet network.

8 Claims, 3 Drawing Sheets

(56) References Cited

U.S. PATENT DOCUMENTS

| | | | |
|---|---|---|---|
| 7,966,219 B1* | 6/2011 | Singh et al. | 705/26.8 |
| 7,966,310 B2* | 6/2011 | Sullivan et al. | 707/709 |
| 2002/0091532 A1* | 7/2002 | Viets et al. | 705/1 |
| 2003/0014450 A1* | 1/2003 | Hoffman | 707/533 |
| 2004/0003060 A1 | 1/2004 | Asoh et al. | |
| 2004/0003293 A1* | 1/2004 | Viets et al. | 713/201 |
| 2004/0111491 A1* | 6/2004 | Raja et al. | 709/219 |
| 2004/0177318 A1* | 9/2004 | Raja et al. | 715/501.1 |
| 2005/0021755 A1* | 1/2005 | Hipp et al. | 709/225 |
| 2006/0031442 A1* | 2/2006 | Ashley et al. | 709/223 |
| 2006/0064406 A1* | 3/2006 | Ehrich et al. | 707/3 |
| 2006/0168345 A1* | 7/2006 | Siles et al. | 709/245 |
| 2007/0005765 A1* | 1/2007 | Lamb et al. | 709/225 |
| 2008/0010368 A1* | 1/2008 | Hubbard et al. | 709/223 |
| 2008/0059632 A1 | 3/2008 | Bocking et al. | |
| 2008/0066172 A1 | 3/2008 | Tarsi | |
| 2008/0201480 A1* | 8/2008 | He et al. | 709/227 |
| 2009/0089352 A1 | 4/2009 | Davis et al. | |
| 2009/0193513 A1* | 7/2009 | Agarwal et al. | 726/15 |
| 2010/0046517 A1* | 2/2010 | Chida | 370/392 |
| 2010/0186079 A1* | 7/2010 | Nice et al. | 726/14 |

OTHER PUBLICATIONS

Curtis Reese; Browser Homepage Personal Connection; Research Disclosure; August 2001; p. 1335; Derwent.

* cited by examiner

PREFERRED RESOURCE SELECTOR

BACKGROUND OF THE INVENTION

The present invention relates generally to a computer implemented method, data processing system, and computer program product for resource location. More specifically, the present invention relates to selecting among preferred resources, for example, websites, based on a networking environment.

Packet networks have formed a core feature to computer communications during recent decades. Packet networks are computing environments that use a computer to break a continuous stream of data into smaller units called packets. A packet comprises two parts. First, the payload is the actual data, which is a subset of the original data stream. Second, the packet may comprise a header, which includes, for example, addressing information concerning at least the destination of the packet. The packets are dispatched to a network of routers and links in a manner that permits each packet to take a differing route than the packets sent ahead of it.

A recent trend in the computer industry is to shift employees to use mobile computers as opposed to desktop computers. This trend results in a user employing a computer in both an office setting as well as within a home setting. While a user is employing a computer within a network of office computers or intranet, a domain administrator may assign the computer an Internet Protocol (IP) address within a range of IP addresses. An IP address may be according to the Internet Protocol version 4 (IPv4) or Internet Protocol version 6 (IPv6) standards having at least 32 bits. An intranet or Internet protocol address is an IP address selected from among a range of IP addresses, where the range is a set number of 32-bit or larger addresses. Specifically, the domain administrator assigns IP addresses within the range with which the network is configured to operate. In other words, the intranet IP address, used when a computer is on the business network, is an address issued within an intranet, for example, a Virtual Private Network (VPN). A VPN is a packet network that is either not connected to the Internet, or an Internet connection is regulated by a firewall.

A user operating within the VPN is allowed access to a number of servers beyond the firewall. These servers typically are inaccessible through the intranet because the firewall will exclude traffic unless such traffic is authorized according to the VPN. A side effect of this circumstance is that a user who has taken a mobile computer outside the intranet may have difficulties when opening a browser to use a preferred resource, particularly when the preferred resource is a server on the intranet. Normally such a resource is located using a Domain Name Service (DNS) operated within the firewall in a manner to look up a corresponding IP address. Importantly, the IP address may only be available to computers operating within the firewall. Accordingly, a browser invoked on a mobile computer may not be able to locate the server. For the user to access promptly the Internet resources, the user is required to type a reachable resource into the browser address field, or otherwise select a resource to interact with through the browser.

An intranet may have additional flexibility through the operation of a firewall. A firewall operates as a control point that binds the intranet to a larger network, for example, the Internet. The firewall inspects packets to determine first whether to admit the packet across an intranet/Internet boundary. Secondly, the firewall may route the packet to an appropriate link, possibly changing packet addresses along the way. Some firewalls are equipped to authenticate nodes located outside the intranet in a manner that those nodes so authenticated are permitted to send packets across the intranet/Internet boundary. An intranet configured to admit traffic from authenticated sources is a VPN. A VPN server process operates on the firewall, while a VPN client executes on the remote computer.

A method and apparatus to overcome these deficiencies is desirable.

SUMMARY OF THE INVENTION

The present invention provides a computer implemented method, and computer program product for requesting resources. The computer receives an assignment of an Internet protocol address. The computer compares a computer context of a client computer with an intranet access criterion to form a comparison result. The computer selects at least one preferred uniform resource identifier, based on the comparison result, indicating the intranet is accessible. The computer transmits a request to a server using at least one preferred uniform resource identifier using a packet network.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
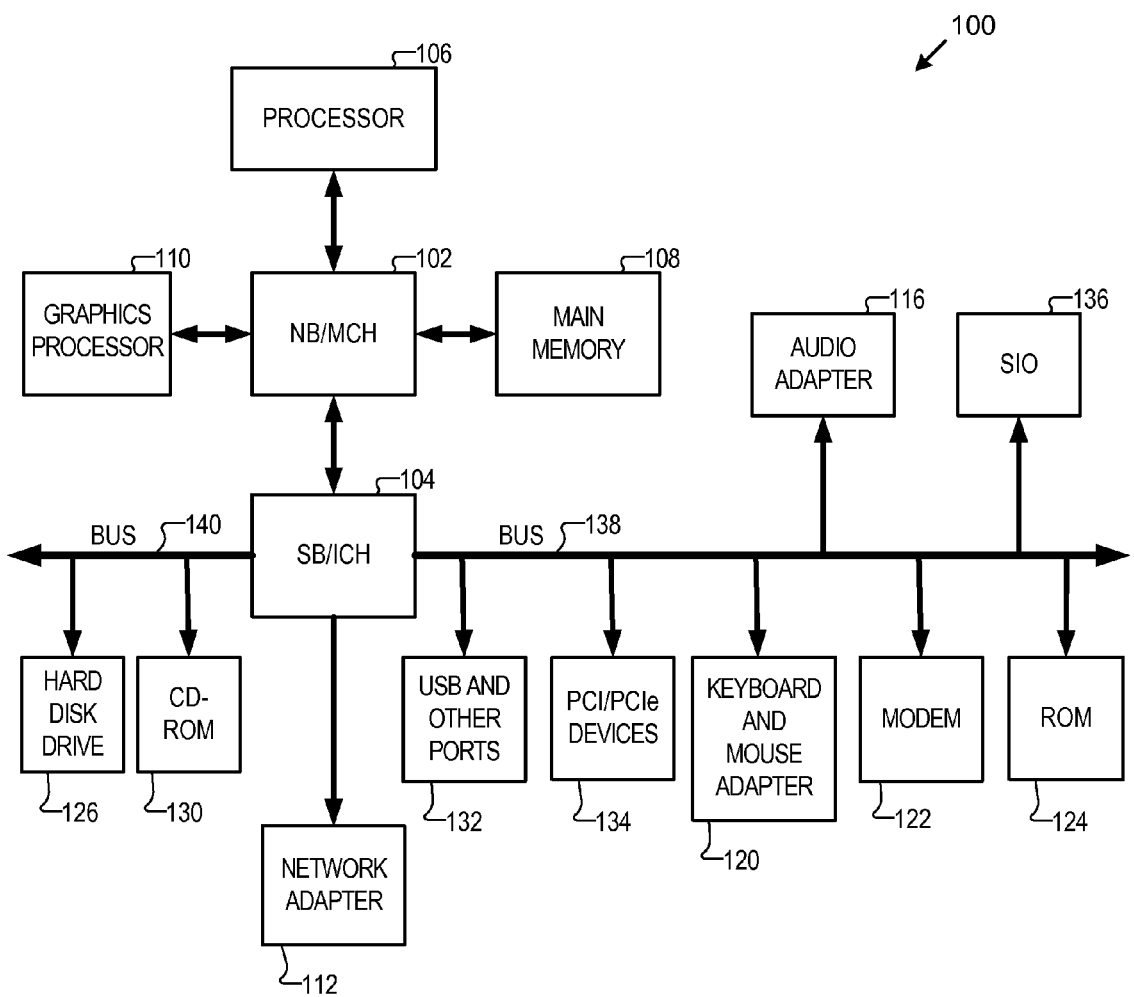
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD)

126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium of expression that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Java is a trademark of Sun Microsystems, Inc. in the United States, other countries, or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments may start a browser session by investigating the computer context within which the client computer operates. A computer context is environment information suggestive of the location of the computer within a computer network. By 'location' it is meant that the computer is present at a position within a topology of networked computers, including, for example, routers. Using the computer context, the browser may determine that an intranet is available in addition to the normal Internet servers. Accordingly, attendant with rendering a user's preferred web pages, operated by preferred servers, the client may access an intranet server when the computer context indicates an intranet access criterion is satisfied. Alternatively, the client may render a secondarily preferred web page operated outside an intranet, when the computer context (of the client) indicates that the client is unable to access intranet resources. An outcome to such browser behavior, is that a user may be shielded from a server-not-found error and other resource availability issues, which the browser can detect, such as a lack of a suitable computer context to access a user-preferred server and/or resource.

Figure 2A:
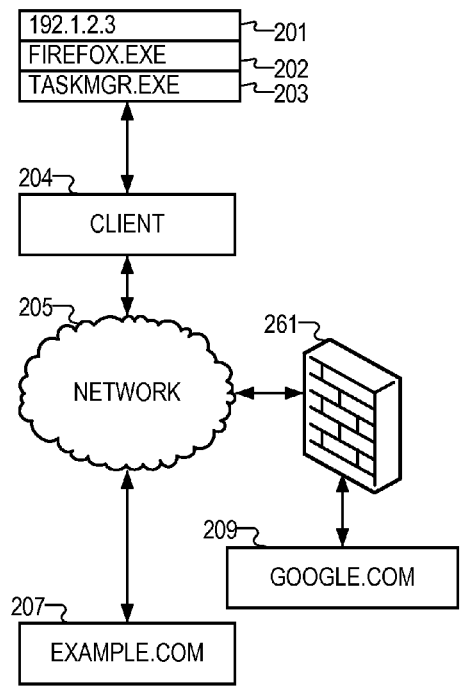
FIG. 2A is a block diagram of a mobile computer operating within a firewall in accordance with an exemplary embodiment of the invention.

FIG. 2A is a block diagram of a mobile computer operating within a firewall in accordance with an exemplary embodiment of the invention. Client 204 is a mobile computer that is attached to an intranet, wherein the intranet permits access to a resource, for example a resource accessed by a domain name such as example.com 207.

A uniform resource identifier (URI) is a string of characters used to identify a name or a resource on a network. A uniform resource identifier may be a uniform resource locator (URL) or a uniform resource name (URN) as described further in RFC 3305, The Internet Society (2002), as hereby incorporated by reference. Examples given herein of a uniform resource locator may be used interchangeably with a URN or a URI to construct illustrative embodiments. Similarly, a preferred uniform resource identifier is an identifier that a user indicates is preferred or rated higher than other URIs, for example, for purposes of a client first rendering the preferred URI among other URIs.

Client 204 may be, for example, data processing system 100 of FIG. 1. Client 204 may reference a computer context when determining whether to display and render resources such as example.com and Google.com. The computer context may be stored to memory of client 204 or non-volatile storage. A computer context can include an IP address such as 192.1.2.3 201. A computer context can include, for example, a running process. A running process is a sequence of computer instructions assigned to operate on a computer and are actually executing on the computer. A running process can include, for example, Firefox.exe 202 or taskmgr.exe 203.

Client 204 may use network 205 to connect to example.com 207. Client 204 may rely on a computer context, for example, assigned intranet IP address 201 or running process 203, in order to select which among the resources to access through a browser. The browser may be, for example, an executing application for retrieving, presenting, and traversing information resources on the World Wide Web. Accordingly, client 204, while within firewall 261, may preferentially select a resource within the firewall such as example.com 207. Such a selection may be made in preference over a user-preferred resource that is located outside the firewall, for example, Google.com 209. Resources 207 and 209 may be servers implemented each by a data processing system according to data processing system 100 of FIG. 1, above. A preferred resource is a server addressable by a Uniform Resource Locator (URL), which a user has designated as a target for rendering when a browser is directed to open a home web page or pages. The preferred resource can be a specific file stored in a server that a corresponding browser client renders in priority over any other resource. The preferred resource can be, for example, a primary tabbed view occupying the majority of a browser's screen area.

Figure 2B:
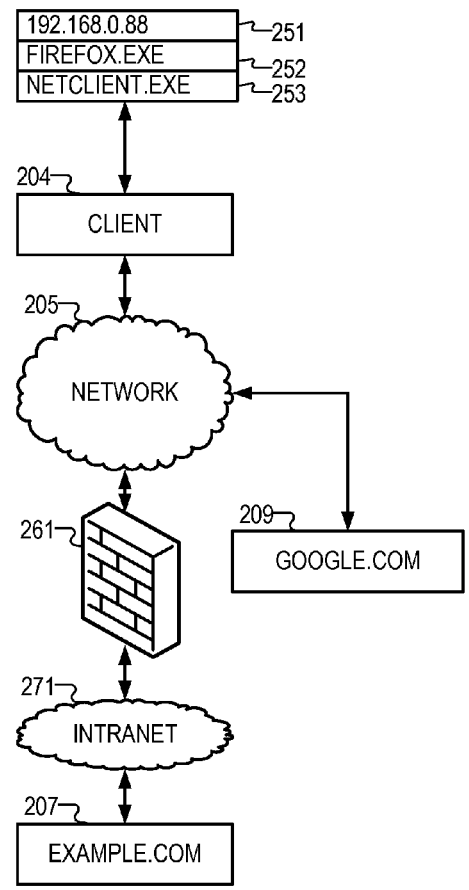
FIG. 2B is a block diagram of a mobile computer operating outside of the firewall in accordance with an exemplary embodiment of the invention.

FIG. 2B is a block diagram of a mobile computer operating outside of the firewall in accordance with an exemplary embodiment of the invention. One example where a user operates outside a firewall includes when a user takes client 204 in a briefcase home from work. At home, the client may be booted up and run on a local network, which is external to intranet 271. Accordingly, packets exchanged between the client and a server referenced by example.com traverse network 205, firewall 261 and intranet 271. Client 204 is now located outside the firewall 261. Client 204 may use network 205 to connect to Google.com 209. In this example, Google.com is a partial URL that is disambiguated by a browser to locate a specific server or server group. Conversely, client 204 may not be able to reach a resource such as one referenced by example.com 207 without the use of a VPN client. A VPN client is a process indicating access to an intranet by way, for example, of a tunnel. A process indicating access to the intranet via virtual private network is a process used to tunnel through a firewall to reach access to intranet resources. A VPN client is available from several commercial sources including Netclient provided by AT&T™ and OpenVPN™. OpenVPN is a trademark of OpenVPN Technologies, Inc.

In the example of FIG. 2B, client 204 is running a process called netclient.exe. That client is recorded to a list of running processes stored, for example, as "netclient.exe" 253. Accordingly, when client 204 is running netclient.exe 253, the client may be able to access resource example.com 207. In response to a computer user invoking client 204 to run a browser, the client 204 may select resource 207 in preference over resource Google.com 209. Consequently, while the client is running netclient.exe 253 the client is able to access resources within firewall 261 and such resources are accessed by default when invoking a browser running on client 204.

Figure 3:
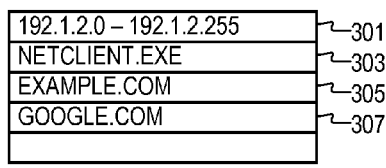
FIG. 3 is a data structure of client preferences in accordance with an exemplary embodiment of the invention.

FIG. 3 is a data structure of client preferences in accordance with an exemplary embodiment of the invention. Data structure 300 includes storage for identifiers, for example, intranet IP address range 301, a VPN client, for example, netclient.exe 303, a preferred uniform resource locator (URL) example.com 305, and a secondary preferred uniform resource locator Google.com 307. An intranet IP address is one or more addresses that are within a network or subnetwork where the network is either independent of the Internet, or protected from unregulated traffic traversing the Internet. An administrator of intranet 271 may allow only a limited range of IP addresses to be assigned to computers that attach within the intranet. Such addresses may be assigned by a Dynamic Host Configuration Protocol (DHCP) server to each computer added to a network. Accordingly, when recording the intranet IP addresses, a user or an administrator may select a range as shown in block 301, which corresponds to allowable IP addresses of a business or other intranet where a client and/or user of the client is authorized. When a computer attaches to a network from beyond the firewall, such as depicted in FIG. 2B, a DHCP server may assign an Internet protocol address. An assignment of an IP address is a packet sent from a server to a computer that has been attached to the network. The packet indicates the IP address that the attached computer is to use when functioning on the network.

Figure 4:
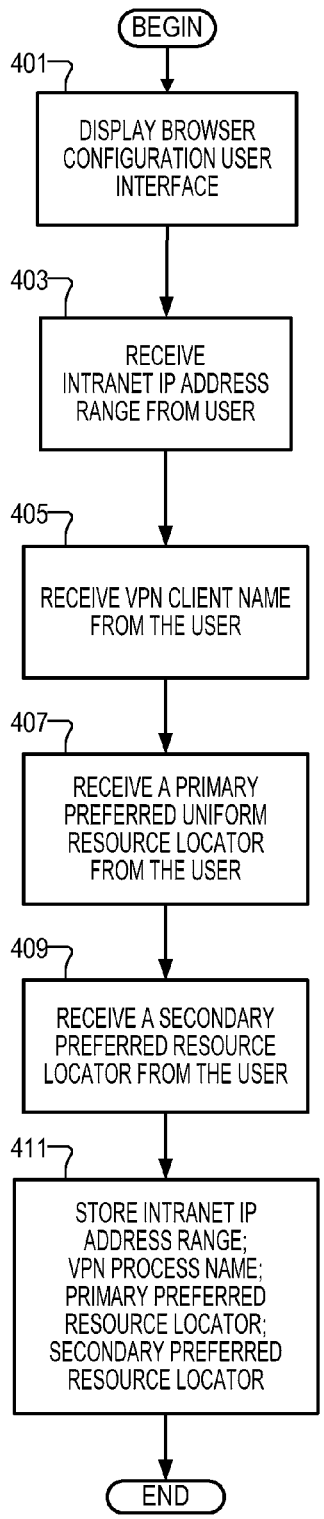
FIG. 4 is a flowchart for browser configuration in accordance with an exemplary embodiment of the invention.

FIG. 4 is a flowchart for browser configuration in accordance with an exemplary embodiment of the invention. Initially, a user may interact with a browser application to indicate that the browser is to be customized or configured to the preferences of the user. Accordingly, the browser displays the browser configuration user interface (step 401). The browser configuration user interface may provide fields for a user to enter information corresponding to the data structure 300 of FIG. 3. Consequently, the client may receive intranet IP address range from the user (step 403). Next, the client may receive a VPN client name from the user (step 405). Next, the client may receive a primary preferred resource locator from the user (step 407). A preferred resource locator is a uniform resource identifier. The primary preferred resource locator can be, for example, a world-wide-web address including, for example, an Internet Corporation for Assigned Names and Numbers (ICANN) coordinated domain name or an Internet Assigned Numbers Authority (IRNA) Internet protocol address.

A Uniform Resource Locator (URL) is a string of characters used to identify a resource reachable over a packet network. A preferred uniform resource locator is a uniform resource located previously selected by a user. The preferred URL can be of a resource located within an intranet. A secondary preferred URL can be a URL of a resource positioned outside an intranet. Next, the client computer may receive a secondary preferred URL from the user (step 409). The client computer may then store the intranet IP address range; VPN process name, primary preferred URL; and secondary preferred URL (step 411). Processing terminates thereafter.

The intranet IP address range or the presence of a VPN client may be used to form an intranet access criterion for the client computer. An intranet access criterion can be a match between a running process and a process indicating access to the intranet via a VPN. Specifically, the running process can be a VPN client executing in the client computer. An intranet access criterion can be a match between the IP address and an intranet IP address. In this second version of an intranet access criterion, the IP address is an Internet protocol address assigned to the client computer, for example, in response to the client computer attaching to a network. An intranet accessible indication is an indication of the status of matching based on the intranet access criterion. Accordingly, the client computer may indicate a status of intranet accessible when the intranet access criterion is satisfied.

Figure 5:
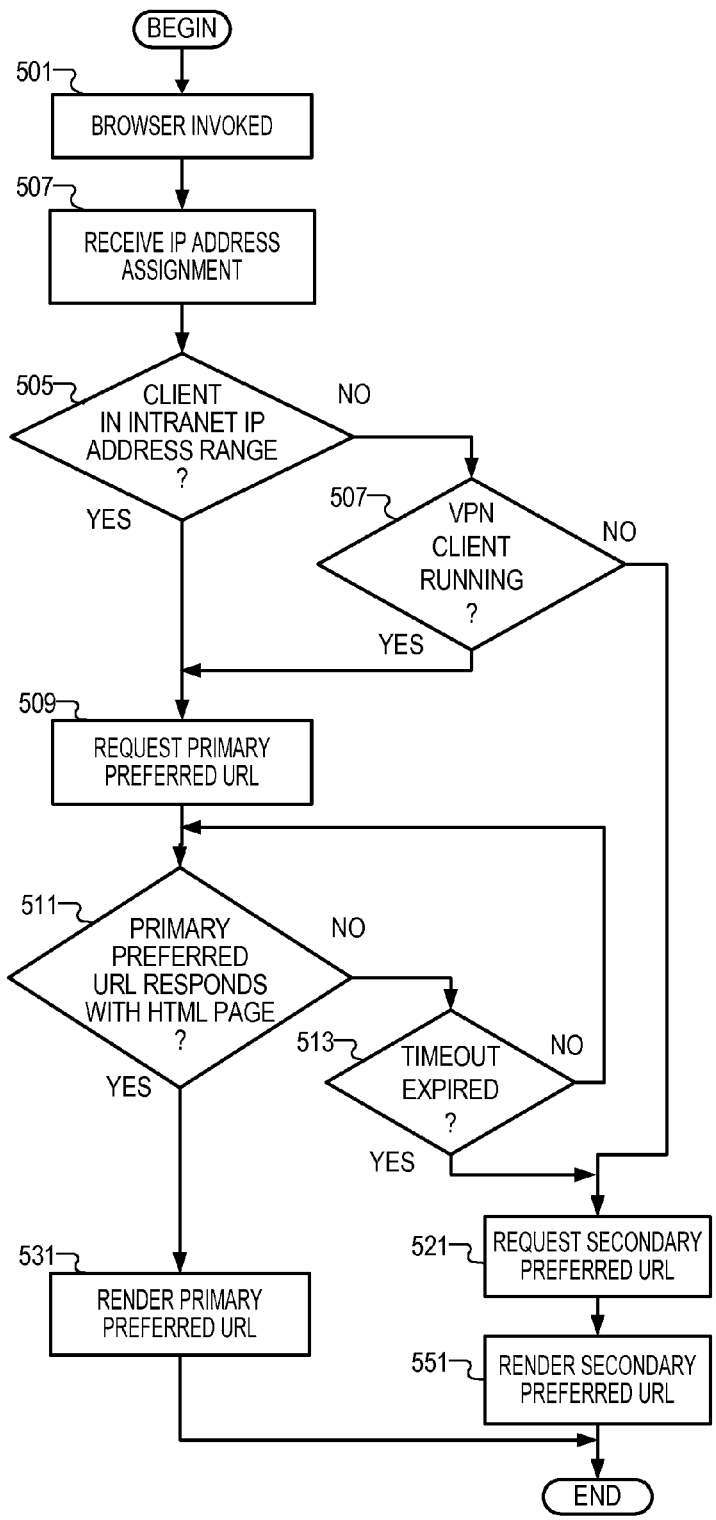
FIG. 5 is a flowchart for selecting a resource in accordance with an exemplary embodiment of the invention.

FIG. 5 is a flowchart for selecting a resource in accordance with an exemplary embodiment of the invention. Initially, a browser may be invoked on the client computer (step 501). Next, the client computer may receive an IP address assignment (step 503). An IP address may be provided by a Dynamic Host Configuration Protocol (DHCP) server, or be added to the client computer by a user. Next, the client computer may determine whether the client's IP address is in the intranet IP address range (step 505). In determining whether the client's IP address is in the intranet IP address range, the client determines a match between the IP address of the client and IP addresses corresponding to the intranet, that is, the intranet IP address range, thus forming a comparison result. The comparison result can be a match or a failure to match, depending on the intranet access criterion used. The intranet IP address range may be as specified at step 403 of FIG. 4 or as shown in data structure 301 of FIG. 3. A positive determination at step 505 may cause the client computer to request the primary preferred URL (step 509).

On the other hand, a negative determination at step 505 may cause the client computer to determine if the VPN client is running (step 507). The negative determination can be because of a comparison result that indicates no match for the intranet access criterion. For example, a client computer that implements step 507 may determine the existing processes while running a Linux® operating system. Linux is a registered trademark of Linus Torvalds in the United States, other countries, or both. Accordingly, the determination may be performed with the 'ps', a command to report a snapshot of the current processes. Processing may subsequently skip to a request of a secondary preferred URL (step 521).

A positive determination at step 507 is suggestive that the computer context is amenable to intranet access. Accordingly, the client computer may request the primary preferred URL (step 509). Thus, a second form of comparison result may be the outcome determined when executing step 507. Accordingly, the processes executing on the client computer may produce comparison results of "match" or "no match" in relation to the presence or absence of a VPN client, as may be stored to VPN client 303 of data structure 300 in FIG. 3. Such an identifier, in this example, is matched among currently running processes of the client computer.

Next, the client computer may determine whether the primary preferred URL responds with a HyperText Markup Language (HTML) page (step 511). A positive result may cause the client computer to render the primary preferred URL (step 531). However, a negative result may cause the client computer to determine whether a timeout has expired (step 513). The client computer may make a negative determination at step 511 if a server responds with a HyperText Transfer Protocol (HTTP) response message in the range of 400s or 500s, as explained in Request For Comments (RFC) 2616, The Internet Society (1999), hereby incorporated by reference. The HTTP response can include a server-not-found error, for example, a response carrying the number 404 as a response code. Step 513 can include a step of starting a timeout clock running by, for example, storing a system time, then, repeatedly comparing a re-iterated check of system time to the stored time until the difference in such values is greater than a timeout value. A timeout or timeout clock is the combination of stored time progression combined with periodic checking the time references to determine if an elapsed period exceeds a threshold. While the result to step 513 is negative, the client computer may repeatedly check to see if the primary preferred URL, or the server associated with the primary preferred URL, responds with HTML, as depicted at step 511. The HTTP timeout period may be selected at a timescale that is a reasonable period for a server to respond to a request, yet is short enough that a second request may be made to a secondary preferred URL and obtain a HTML response quickly enough to not arouse suspicions by the user that a server failure to respond has occurred.

However, a positive determination of an expired HTTP timeout may cause the client computer to request a secondary preferred URL (step 521). Steps 521 and 509 may be performed by transmitting a request over a packet network, for example, network 205 or intranet 271 of FIG. 2B. A request is one or more packets sent across a packet network requesting access to a resource. A request can be for example, a hypertext transport protocol request. A request can be, for example, a file transfer protocol request. Step 521 may also be performed by the client computer in response to a negative outcome at step 507. The secondary preferred URL may be associated with a second server. The second server may respond with a web page or other Internet-mediated data, including a status-line in the range of 200s. In response, the client computer may render the secondary preferred URL (step 551). Processing terminates thereafter.

The illustrative embodiments permit a user to select a primary preferred URL and a secondary preferred URL. Such URLs may be used as a home page for a user who moves a client computer from an intranet environment to networking environments outside the intranet. Accordingly, the client computer may respond to a browser invocation by selecting a primary preferred URL where the computer context suggests that the computer can access a server identified by the primary preferred URL. Alternatively, client computer implemented according to one or more exemplary embodiments may select a secondary preferred URL in response to a computer context that suggests that the primary preferred URL is not reachable by a packet network that the client computer relies upon. Some embodiments may permit the client computer to skip rendering a server-not-found error when a primary preferred URL is the target of a resource request, and such a request fails to produce a response within a timeout period.

Alternative embodiments may include omission of one or more steps, for example step 513. Accordingly, step 513 may be skipped in cases where a conclusive response is received that indicates a server is unavailable or that a particularly referenced file is not present on the server. In such a case, a test for time-outs can be unnecessary. In which case, such an alternative embodiment may promptly request a secondary preferred URL by performing machine instructions that implement step 521.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can store the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for requesting resources, the method, further comprising:
   a computer receiving an assignment of an Internet protocol address;
   the computer comparing a computer context of the computer with an intranet access criterion to form a comparison result, wherein the computer context comprises the Internet protocol address and the intranet access criterion comprises a match between the Internet protocol address and an intranet Internet protocol address;
   the computer selecting at least one preferred uniform resource identifier based on the comparison result indicating intranet accessible;
   the computer transmitting a request to a server using the at least one preferred uniform resource identifier using a packet network;
   the computer running a timeout clock, in response to the computer transmitting the request; and
   the computer determining that a timeout expired prior to receiving a response responsive to the request; and wherein the computer transmitting the request to the server comprises sending the request to a server not in an intranet, and the transmitting is responsive to the computer determining that the timeout expired.

2. A method for requesting resources, the method comprising:
   a computer receiving an assignment of an Internet protocol address;
   the computer comparing a computer context of the computer with an intranet access criterion to form a comparison result, wherein the computer context comprises the Internet protocol address and the intranet access criterion comprises a match between the Internet protocol address and an intranet Internet protocol address;
   the computer selecting at least one preferred uniform resource identifier based on the comparison result indicating intranet accessible; and
   the computer transmitting a request to a server using the at least one preferred uniform resource identifier using a packet network;
   the computer receiving a server-not-found error; and
   the computer transmitting a request to a second server using a preferred uniform resource identifier not within the intranet.

3. The method of claim 2, the computer skipping wherein rendering the server-not-found error responsive to the computer receiving the server-not-found error.

4. A computer program product for requesting resources, the computer program product comprising:
   a computer readable tangible storage device having computer readable program code stored therewith, the computer readable program code comprising:
   computer readable program code configured to receive an assignment of an Internet protocol address to a client computer;
   computer readable program code configured to compare a computer context of the client computer with an intranet access criterion to form a comparison result, wherein the computer context comprises the Internet protocol address and the intranet access criterion comprises a match between the Internet protocol address and an intranet Internet protocol address;
   computer readable program code configured to select at least one preferred uniform resource identifier based on the comparison result indicating intranet accessible;
   computer readable program code configured to transmit a request to a server using the at least one preferred uniform resource identifier using a packet network;
   computer readable program code configured to run a timeout clock, in response to transmitting the request; and
   computer readable program code configured to determine that a timeout expired prior to receiving a response responsive to the request; and wherein the computer readable program code to transmit the request to the server comprises computer readable program code to send the request to a server not in an intranet, responsive to a determination that the timeout has expired.

5. A computer program product for requesting resources, the computer program product comprising:
   a computer readable tangible storage device having computer readable program code stored therewith, the computer readable program code comprising:
   computer readable program code configured to receive an assignment of an Internet protocol address to a client computer;
   computer readable program code configured to compare a computer context of the client computer with an intranet access criterion to form a comparison result, wherein the computer context comprises the Internet protocol address and the intranet access criterion comprises a match between the Internet protocol address and an intranet Internet protocol address;
   computer readable program code configured to select at least one preferred uniform resource identifier based on the comparison result indicating intranet accessible;
   computer readable program code configured to transmit a request to a server using the at least one preferred uniform resource identifier using a packet network;
   computer readable program code configured to receive a server-not-found error; and
   computer readable program code configured to transmit a request to a second server using a preferred uniform resource identifier not within an intranet.

6. The computer program product of claim 5, further comprising computer readable program code, stored on the computer readable tangible storage device, configured to skip rendering the server-not-found error, in response to receiving the server-not-found error.

7. A data processing system, for requesting resources, the data processing system comprising:
   a hardware processor, a computer readable memory and a computer readable tangible storage device;
   first program instructions to receive an assignment of an Internet protocol address to the data processing system;
   second program instructions to compare a computer context of the data processing system with an intranet access criterion to form a comparison result, wherein the computer context comprises the Internet protocol address and the intranet access criterion comprises a match between the Internet protocol address and an intranet Internet protocol address;
   third program instructions to select at least one preferred uniform resource identifier based on the comparison result indicating intranet accessible;
   fourth program instructions to transmit a request to a server using the at least one preferred uniform resource identifier using a packet network;
   fifth program instructions to run a timeout clock, in response to transmitting the request; and sixth program instructions to determine that a timeout expired prior to receiving a response responsive to the request, wherein the fourth program instructions send the request to a server not in an intranet, responsive to a determination that the timeout has expired;

wherein the first, second, third, fourth, fifth and sixth program instructions are stored on the computer readable tangible storage device for execution by the hardware processor via the computer readable memory.

8. A data processing system for requesting resources, the data processing system comprising:

a hardware processor, a computer readable memory, and a computer readable tangible storage device;

first program instructions to receive an assignment of an Internet protocol address to the data processing system;

second program instructions to compare a computer context of the data processing system with an intranet access criterion to form a comparison result, wherein the computer context comprises the Internet protocol address and the intranet access criterion comprises a match between the Internet protocol address and an intranet Internet protocol address;

third program instructions to select at least one preferred uniform resource identifier based on the comparison result indicating intranet accessible;

fourth program instructions to transmit a request to a server using the at least one preferred uniform resource identifier using a packet network;

fifth program instructions to receive a server-not-found error; and sixth program instructions to transmit a request to a second server using a preferred uniform resource identifier not within an intranet;

wherein the first, second, third, fourth, fifth, and sixth program instructions are stored on the computer readable tangible storage device for execution by the hardware processor via the computer readable memory.

* * * * *